United States Patent
Boisset et al.

(10) Patent No.: US 10,668,927 B2
(45) Date of Patent: Jun. 2, 2020

(54) METHOD OF DETERMINING THE STATE OF A ROAD

(71) Applicants: Continental Automotive France, Toulouse (FR); Continental Automotive GmbH, Hannover (DE)

(72) Inventors: Jean-Philippe Boisset, Montauban (FR); Parthiv Dharamshi, Regensburg (DE)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/308,636

(22) PCT Filed: Jun. 13, 2017

(86) PCT No.: PCT/FR2017/051511
§ 371 (c)(1),
(2) Date: Dec. 10, 2018

(87) PCT Pub. No.: WO2017/216466
PCT Pub. Date: Dec. 21, 2017

(65) Prior Publication Data
US 2019/0270456 A1    Sep. 5, 2019

(30) Foreign Application Priority Data

Jun. 14, 2016   (FR) ..................................... 1655515

(51) Int. Cl.
*B60W 40/06*   (2012.01)
*B60W 50/00*   (2006.01)
*G01B 17/08*   (2006.01)

(52) U.S. Cl.
CPC ............ *B60W 40/06* (2013.01); *B60W 50/00* (2013.01); *G01B 17/08* (2013.01); *B60W 2050/0026* (2013.01); *B60W 2050/0057* (2013.01)

(58) Field of Classification Search
CPC ................. B60W 40/06; B60W 50/00; B60W 2050/0026; B60W 2050/0057; G01B 17/08
See application file for complete search history.

(56) References Cited

U.S. PATENT DOCUMENTS

| | | | | |
|---|---|---|---|---|
| 4,749,210 A | * | 6/1988 | Sugasawa | B60G 17/0165 280/124.102 |
| 2002/0162389 A1 | * | 11/2002 | Yokota | B60C 23/06 73/146 |

(Continued)

FOREIGN PATENT DOCUMENTS

| EP | 2573594 A1 | 3/2013 |
|---|---|---|
| EP | 2774784 A1 | 9/2014 |

(Continued)

OTHER PUBLICATIONS

M. H. Walters, Uneven Wear of Vehicles Tires, 1993, vol. 21, No. 4, pp. 202-219.*

(Continued)

*Primary Examiner* — Mischita L Henson
(74) *Attorney, Agent, or Firm* — RatnerPrestia

(57) ABSTRACT

A method of determining the level of quality of a road from an electronic measurement unit mounted in a wheel of a motor vehicle traveling on the road. The electronic measurement unit includes at least one sensor able to measure the vibrations perceived by the tread of the tire of said wheel. The method includes measuring, using the sensor, the vibrations perceived by the tread of the tire of the wheel, calculating the strength of the vibrations measured at a (Continued)

predetermined vibrational frequency referred to as the distinguishing frequency, comparing the calculated strength with predetermined strength values contained in a table stored in a memory zone, which are characteristic of various road quality levels, and determining the level of quality of the road from the comparison made.

11 Claims, 2 Drawing Sheets

(56) References Cited

U.S. PATENT DOCUMENTS

| | | | |
|---|---|---|---|
| 2009/0105921 A1* | 4/2009 | Hanatsuka | B60G 17/0165 |
| | | | 701/80 |
| 2014/0228459 A1* | 8/2014 | Shimanaka | B60C 1/0016 |
| | | | 521/88 |
| 2016/0368501 A1 | 12/2016 | Suzuki et al. | |

FOREIGN PATENT DOCUMENTS

| | | | |
|---|---|---|---|
| EP | 2883772 A1 | | 6/2015 |
| JP | 11153518 A | * | 6/1999 |
| KR | 20140095282 A | * | 8/2014 |
| WO | 2006054976 A1 | | 5/2006 |
| WO | 2015141199 A1 | | 9/2015 |

OTHER PUBLICATIONS

Arto J. Niskanen et al., Accelerometer Tyre to Estimate the Aquaplaning State of the Tyre-Road Contact, Jun. 28, 2015, 2015 IEEE Intelligent Vehicles Symposium (IV), pp. 343-348.*

Roy McCann et al., System Identification for a Model-Based Observer of a Road Roughness Profiler, Apr. 2007, 2007 IEEE Region 5 Technical Conference IEEE, pp. 336-343.*

English translation of the Written Opinion for International Application No. PCT/FR2017/051511, dated Sep. 20, 2017—5 pages.

International Search Report and Written Opinion for International Application No. PCT/FR2017/051511, dated Sep. 20, 2017—6 pages.

* cited by examiner

METHOD OF DETERMINING THE STATE OF A ROAD

CROSS REFERENCE TO RELATED APPLICATIONS

This application is the U.S. National Phase Application of PCT International Application No. PCT/FR2017/051511, filed Jun. 13, 2017, which claims priority to French Patent Application No. 1655515, filed Jun. 14, 2016, the contents of such applications being incorporated by reference herein.

FIELD OF THE INVENTION

The invention relates to the automotive field and relates more specifically to a method of determining the state of a road from a measurement sensor mounted in a wheel of a motor vehicle.

BACKGROUND OF THE INVENTION

In a motor vehicle it is known practice to use a certain number of sensors to measure various parameters.

It is notably known practice to mount within each wheel of the vehicle an electronic measurement unit comprising one or several sensors enabling one or several parameters to be measured. Such an electronic measurement unit is generally mounted inside the tire, on the internal face of the tread, or alternatively on the inflating valve. This unit measures parameters and transmits them in full or in part to a computer of the vehicle so that it can determine a state of the wheel or of the vehicle.

By way of example, such an electronic measurement unit may make it possible to measure the acceleration of the wheel, the knocks experienced by the wheel or alternatively the tire pressure, so as respectively to determine the speed of the vehicle, the load thereon or a fault with the inflation of the wheel. In these applications, the central frequencies used are of the order of a few hertz, for example of 7.8 Hz when the vehicle is running at approximately 60 km/h.

There are certain functions specific to the electronic measurement unit that need to be able to be activated or not, or to have their operating parameters adapted according to the quality of the road. By way of example, for measuring vehicle load, it may be desirable to adapt the value of the parameters of a filter used for processing the measured signal, which processing is performed by the electronic measurement unit or to adapt the load thresholds, according to the characteristics of the road.

There is not at the present time any solution that makes it possible to determine the quality of the road so as to activate certain functions or adapt the operating parameters of an electronic measurement unit mounted in a wheel of a motor vehicle.

SUMMARY OF THE INVENTION

An aspect of the present invention aims to overcome these disadvantages by proposing a simple, reliable and effective solution that makes it possible to determine the quality of a road so as to activate certain functions or adapt the operating parameters of an electronic measurement unit mounted in a wheel of a motor vehicle traveling on said road.

To this end, an aspect of the invention relates first of all to a method of determining the level of quality of a road from an electronic measurement unit mounted in a wheel of a motor vehicle traveling on said road, said electronic measurement unit comprising at least one sensor able to measure the vibrations perceived by the tread of the tire of said wheel, said method being notable in that it comprises the steps of:
- measuring, using the sensor, the vibrations perceived by the tread of the tire of the wheel,
- calculating the strength of the vibrations measured at a predetermined vibrational frequency, referred to as the distinguishing frequency,
- comparing the calculated strength with predetermined strength values contained in a memory zone, which are characteristic of various road quality levels, and
- determining the level of quality of the road from the comparison made.

The distinguishing frequency is notable in that it allows the various levels of quality of the road to be easily distinguished and in that it remains constant regardless of the running speed and state of wear of the tire. This distinguishing frequency may, however, vary according to the nature of the road surface covering.

According to one aspect of the invention, the distinguishing frequency is chosen in the frequency range comprised between 300 Hz and 500 Hz, preferably between 400 Hz and 460 Hz, more preferably still is of the order of 450 Hz.

Specifically, whereas the sensors in the existing solutions are used for measurements taken in the frequency band comprised between zero and a few hertz in which band the vibrations are of comparable strength for various levels of road quality, operating around a frequency situated in the 300-500 Hz band makes it possible to distinguish the strength of the vibrations at different levels of road quality.

What is meant by the term "quality" is, for example, the smooth, intermediate or rough appearance of the road, in the knowledge that the number of quality levels could of course be lower or higher than three, or alternatively the state of the road, for example dry or wet.

According to one aspect of the invention, the road is qualified as rough or wet when the strength of the vibrations is above a first predetermined strength threshold, referred to as the roughness threshold or the wetness threshold, respectively.

According to another aspect of the invention, the road is qualified as smooth or dry when the strength of the vibrations is below a second predetermined strength threshold lower than the first strength threshold and referred to as the flatness threshold or the dryness threshold, respectively.

According to another aspect of the invention, the quality of the road is said to be intermediate when the strength of the vibrations is comprised between the roughness threshold and the flatness threshold, or respectively, between the wetness threshold and the dryness threshold.

The values of the roughness threshold and of the flatness threshold (and, respectively, of the wetness threshold and of the dryness threshold) may vary with the thickness of the tire tread and the speed of the vehicle.

An aspect of the invention also relates to a measurement device able to be mounted in a motor vehicle so as to determine the level of quality of a road, said device being notable in that it comprises:
- at least one electronic measurement unit mounted in a wheel of the vehicle and comprising at least one sensor able to measure the vibrations perceived by the tread of the tire of said wheel,
- a calculation module for calculating the strength of the vibrations measured by the sensor at a predetermined vibrational frequency referred to as the distinguishing frequency, a comparison module for comparing the calculated strength against predetermined strength values contained in a memory zone and characteristic of various levels of quality of a road, and a determination module for determining the level of quality of the road from the comparison made.

An aspect of the invention finally relates to a motor vehicle comprising a measurement device as described hereinabove.

BRIEF DESCRIPTION OF THE DRAWINGS

Further features and advantages of aspects of the invention will become apparent during the following description given with reference to the attached figures provided by way of nonlimiting examples and in which identical references are given to objects that are similar.

DETAILED DESCRIPTION OF THE PREFERRED EMBODIMENTS

Figure 1:
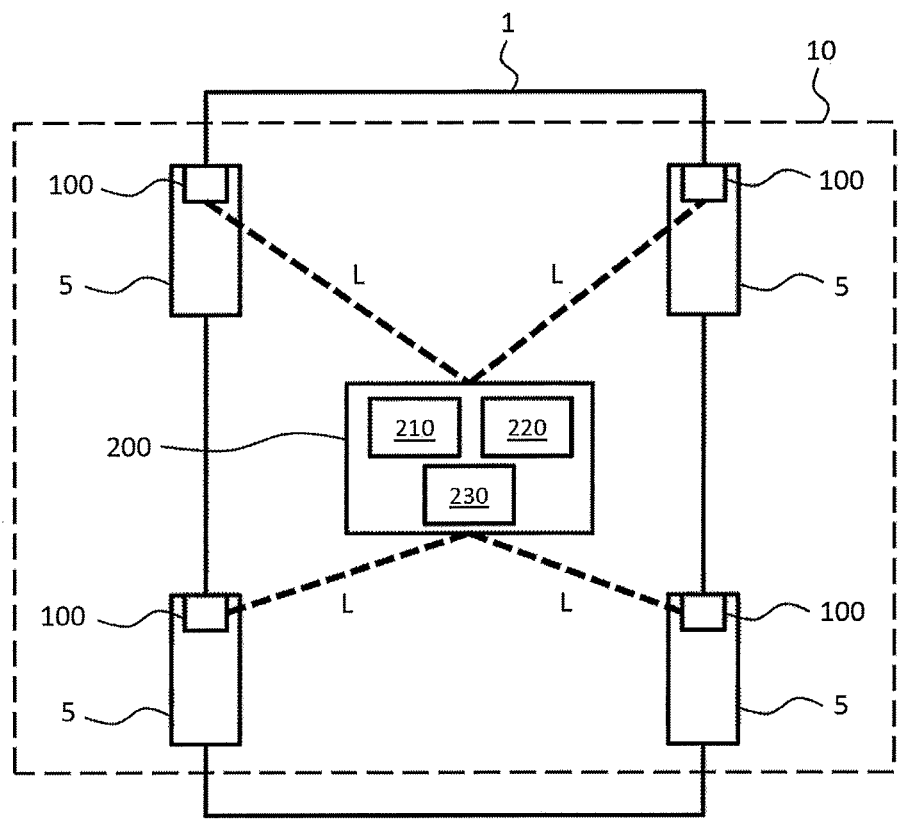
FIG. 1 schematically illustrates one embodiment of a motor vehicle according to the invention.

FIG. 1 depicts a motor vehicle 1 comprising four wheels 5 and a measurement device 10 according to an aspect of the invention.

Such a measurement device 10 makes it possible to determine the level of quality of a road on which the vehicle 1 is traveling.

In the embodiment illustrated, the device 10 comprises four electronic measurement units 100 and a computer 200 known by the name of electronic control unit (ECU).

Each electronic measurement unit 100 is mounted in a wheel 5 of the vehicle 1. For preference, each electronic measurement unit 100 is mounted on the tread of the tire (not depicted) of the wheel 5. As an alternative, each electronic measurement unit 100 could be mounted on the inflation valve (not depicted) of the wheel 5.

Each electronic measurement unit 100 comprises at least one sensor (not depicted) able to measure the vibrations perceived by the tread of the tire of said wheel 5. Such a sensor is commonly referred to as a "vibration sensor".

In this embodiment, the computer 200 comprises a calculation module 210, a comparison module 220 and a determination module 230.

However, it will be noted that, as an alternative, one or all of the modules 210, 220 and 230 could be implemented by each of the electronic measurement units 100.

The calculation module 210 is able to calculate the strength of the vibrations measured by the sensor at a predetermined vibrational frequency referred to as the distinguishing frequency.

The distinguishing frequency is notable in that it makes it possible easily to distinguish the various levels of quality of the road and in that it remains constant regardless of the running speed and state of wear of the tire. This distinguishing frequency may, however, vary according to the nature of the road surface covering.

The distinguishing frequency is chosen in the range of frequencies comprised between 300 Hz and 500 Hz, preferably between 400 Hz and 460 Hz, and more preferably still is of the order of 450 Hz.

The comparison module 220 is able to compare a strength calculated by the calculation module 210 against predetermined strength values contained in a table stored in a memory zone (not depicted), characteristic of various levels of quality of a road. This memory zone may, for example, be located in the computer 200.

Finally, the determination module 230 is able to determine the level of quality of the road from a comparison made by the comparison module 220.

Figure 3:
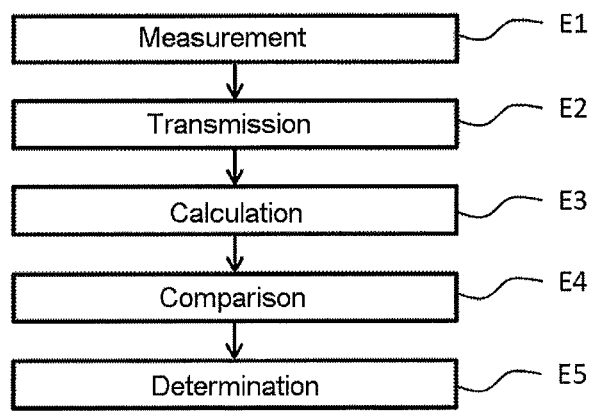
FIG. 3 illustrates one embodiment of the method according to the invention.

One exemplary embodiment of the method according to an aspect of the invention will now be described with reference to FIGS. 2 and 3.

In this nonlimiting example, the road is qualified as:

rough when the strength of the vibrations is above a first predetermined strength threshold referred to as the roughness threshold $S_R$, smooth when the strength of the vibrations is below a second predetermined strength threshold lower than the first strength threshold and referred to as the flatness threshold $S_P$, and intermediate when the strength of the vibrations is comprised between the roughness threshold $S_R$ and the flatness threshold $S_P$.

The values of the roughness threshold $S_R$ and of the flatness threshold $S_P$ may vary with the thickness of the tire tread and the speed of the vehicle 1.

Figure 2:
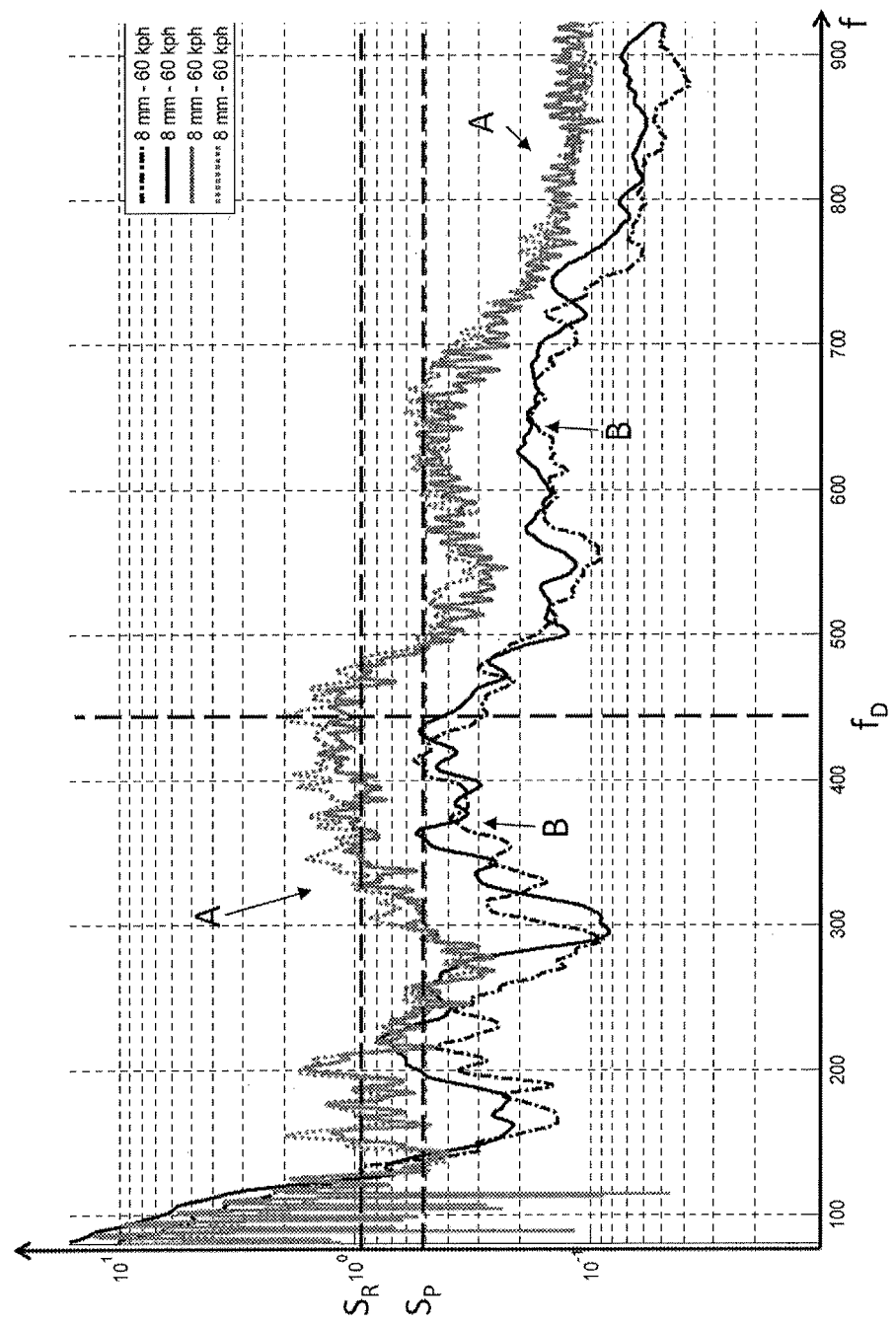
FIG. 2 depicts one example of a diagram expressing the strength of the vibrations perceived by a vehicle running on two types of road, rough and smooth, as a function of frequency.

In the example of FIG. 2, the value of the flatness threshold $S_P$ is set at $5 \times 10^{-1}$ dB and the value of the roughness threshold $S_R$ is set at $9 \times 10^{-1}$ dB. In this example, the distinguishing frequency $f_D$ has been set at 450 Hz.

This figure depicts two passes of the vehicle 1 over a rough road A then a smooth road B at a speed of 60 km/h with a tread the thickness of which is 8 mm.

It may be seen then that the strengths of the vibrations between road A and road B can clearly be distinguished unambiguously in the frequency range varying from 300 Hz to 500 Hz and particularly at the distinguishing frequency $f_D$ of 450 Hz.

It will be noted that the road quality levels could also refer to the state of the road, for example dry or wet as mentioned earlier, or any other suitable parameter characteristic of the road.

Thus, in order to determine the level of quality of the road, in the case of at least one of the electronic measurement units 100, the associated sensor measures in real time the vibrations perceived by the tread of the tire of the wheel 5 in a step E1 (referred to as the measurement step) and transmits these measurements, in a known manner, over a communications link L (with reference to FIG. 1) to the computer 200 in a step E2 (referred to as the transmission step).

The calculation module 210 then, in a step E3 (referred to as the calculation step) calculates the strength of the vibrations measured at the distinguishing frequency $f_D$ of 450 Hz.

The comparison module 220 then compares the calculated strength against the roughness threshold $S_R$ and the flatness threshold $S_P$ which are stored in the table in the memory zone in a step E4 (referred to as comparison step).

Finally, the determination module 230 then, in a step E5 (referred to as the determination step) determines the level of quality of the road on the basis of the comparison made by the comparison module 220. In the example of FIG. 2, the road A is determined as being rough and the road B is determined as being smooth.

Certain functions specific to the electronic measurement unit need to be able to be activated or not, or need to have their operating parameters adapted according to the quality of the road.

For example, for measuring tire wear, it is conceivable to measure the gradient (which means to say the controlling coefficient) of a transfer function making it possible to determine tire thickness or tire wear. Such a transfer function may be a linear function ($y=ax+b$) or a quadratic function ($y=ax^2+bx+c$) where y represents the value of the thickness of the tire and the gradient corresponds to the coefficient a, it being possible for this expected coefficient a to be adapted according to the characteristics of the road.

Still by way of example, for measuring vehicle load it may be desirable to adapt the load thresholds and the value of a numerical filter used for processing and applied to the measured signal by the electronic measurement unit to eliminate road noise, according to the characteristics of the road. Thus the degree of filtering applied may vary up or down according to the quality of the road.

In the foregoing explanation, the example is given for determining the roughness or flatness of a road, although it could be applied in the same way to determining respectively the wetness or the dryness of a road.

It must also be specified that the aspects of the present invention are not restricted to the examples described hereinabove and can be varied in numerous ways accessible to those skilled in the art.

The invention claimed is:

1. A method of determining a level of quality of a road from a vibration sensor mounted in a wheel of a motor vehicle traveling on said road, said vibration sensor able to measure vibrations perceived by the tread of the tire of said wheel, said method comprising:
   selecting a predetermined vibrational frequency within a frequency range, the predetermined vibrational frequency referred to as the distinguishing frequency, measuring, by the vibration sensor at the distinguishing frequency, the vibrations perceived by the tread of the tire of the wheel as the motor vehicle is traveling on said road,
   calculating, by a processor of the motor vehicle, a strength of the vibrations measured at the distinguishing frequency, the distinguishing frequency is maintained constant as the speed of the motor vehicle and wear of the tire vary as the motor vehicle is traveling on said road, comparing, by the processor, the calculated strength with predetermined strength values which are characteristic of various road quality levels, and determining, by the processor, the level of quality of the road from the comparison.

2. The method as claimed in claim 1, wherein the distinguishing frequency is chosen in the frequency range comprised between 300 Hz and 500 Hz.

3. The method as claimed in claim 2, wherein the distinguishing frequency is chosen in the frequency range comprised between 400 Hz and 460 Hz.

4. The method as claimed in claim 3, wherein the distinguishing frequency is of the order of 450 Hz.

5. The method as claimed in claim 1, in which the road is qualified as rough or wet when the strength of the vibrations is above a first predetermined strength threshold, referred to as the roughness threshold or the wetness threshold, respectively.

6. The method as claimed in claim 5, in which the road is qualified as smooth or dry when the strength of the vibrations is below a second predetermined strength threshold lower than the first strength threshold and referred to as the flatness threshold or the dryness threshold, respectively.

7. The method as claimed in claim 6, in which the quality of the road is said to be intermediate when the strength of the vibrations is comprised between the roughness threshold and the flatness threshold.

8. The method as claimed in claim 1, wherein the motor vehicle has four wheels.

9. A vehicle system able to be mounted in a motor vehicle so as to determine a level of quality of a road, said vehicle system comprising:
   a vibration sensor mounted in a wheel of the vehicle to measure vibrations perceived by the tread of the tire of said wheel; and
   a processor for:
      selecting a predetermined vibrational frequency within a frequency range, the predetermined vibrational frequency referred to as the distinguishing frequency, calculating a strength of the vibrations measured by the sensor at the distinguishing frequency, the distinguishing frequency is maintained constant as the speed of the motor vehicle and wear of the tire vary as the motor vehicle is traveling on said road, comparing the calculated strength against predetermined strength values which are characteristic of various levels of quality of a road, and determining the level of quality of the road from the comparison made.

10. A motor vehicle comprising a vehicle system as claimed in claim 9.

11. The vehicle system as claimed in claim 9, wherein the motor vehicle has four wheels.

* * * * *